Aug. 13, 1957

J. G. L. GIEVERS 2,802,364

GYROSCOPE

Filed Jan. 11, 1955

Inventor.
Johannes G. L. Gievers.
By Schroeder, Hofgren,
Brady & Wegner.
Attorneys.

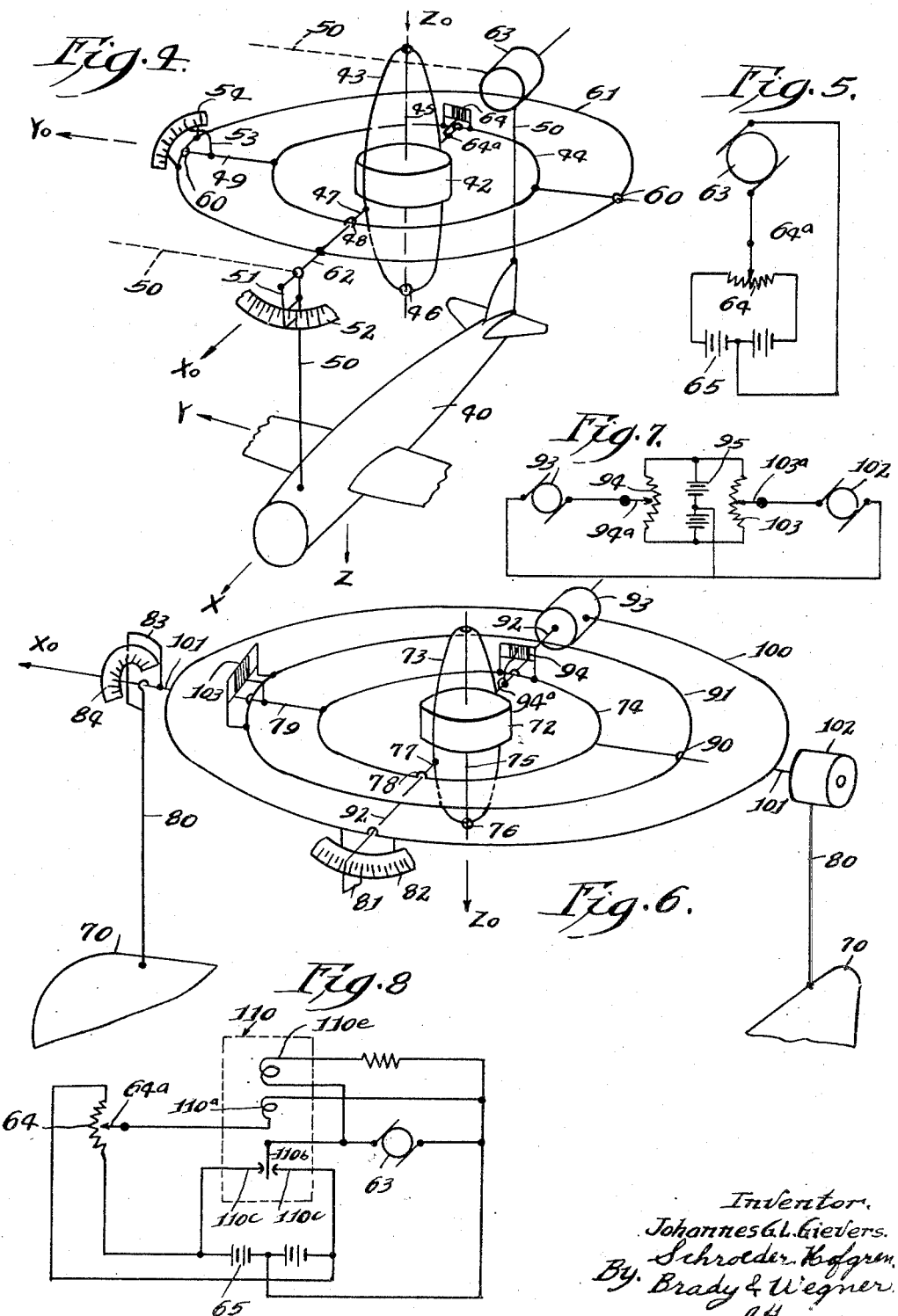

Aug. 13, 1957  J. G. L. GIEVERS  2,802,364
GYROSCOPE
Filed Jan. 11, 1955  3 Sheets-Sheet 3
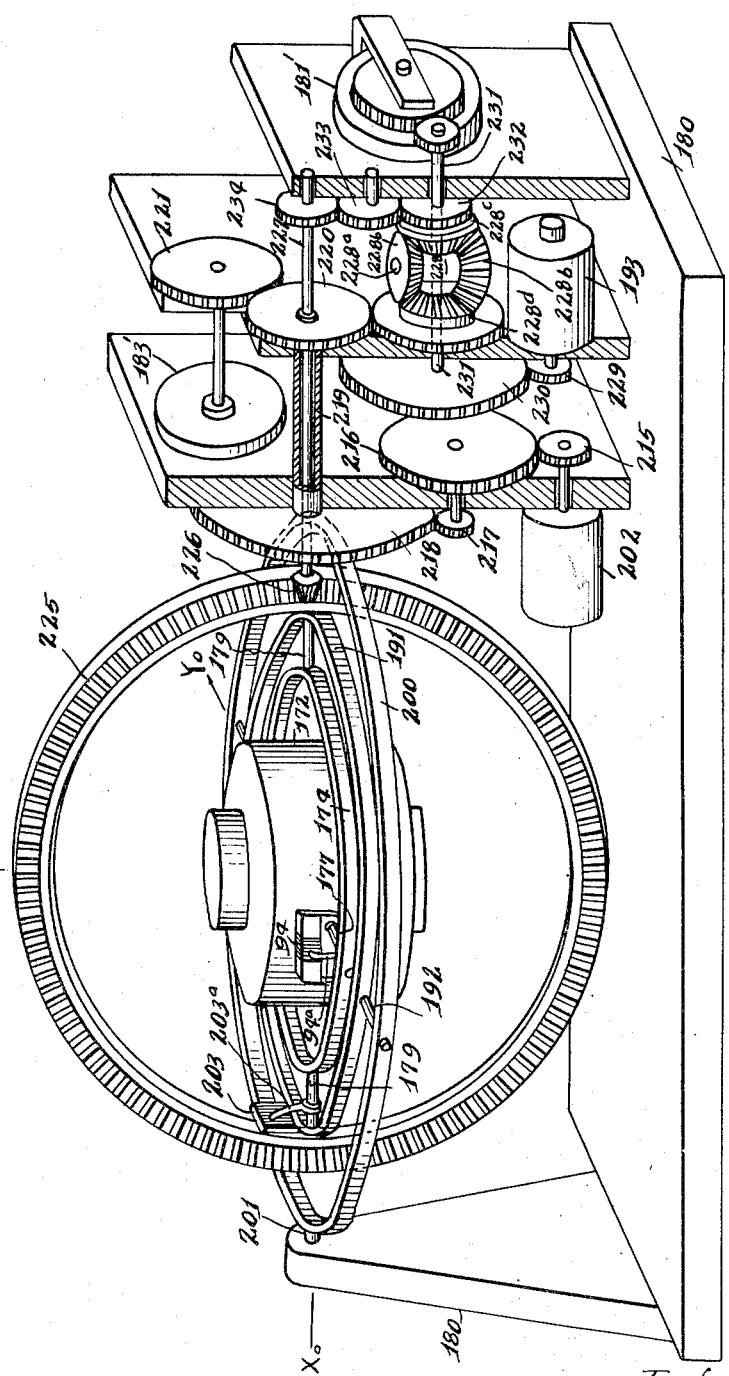
Inventor.
Johannes G. L. Gievers.
By Schroeder, Hofgren,
Brady & Wegner.
Attorneys United States Patent Office 2,802,364
Patented Aug. 13, 1957

2,802,364

GYROSCOPE

Johannes G. L. Gievers, Lemont, Ill., assignor to Ampatco Laboratories Corporation, a corporation of Delaware Application January 11, 1955, Serial No. 481,145

12 Claims. (Cl. 74—5.2)

This invention is concerned with a mounting for a gyroscope and more particularly with a mounting for a gyroscope used in an aircraft.

Gyroscopes, or "gyros," presently in use as stable reference elements in aircraft attitude indicator and autopilot systems are generally provided with a mounting comprising two gimbal rings, one being rotatably mounted on the aircraft and the other being rotatably mounted on the first about an axis at right angles to the mounting axis of the first. The rotor element of the gyroscope is mounted on the second or inner gimbal ring and rotates about an axis generally normal to the mounting axes of both rings.

Two problems presented in the utilization of such gyroscopes in aircraft control and indicating systems will be discussed herein. Under certain conditions, as will be explained fully later, the planes of the two gimbal rings may become aligned in what is commonly referred to as "gimbal lock" position. When this occurs, there is a chance that the gyroscope may be caused "to tumble," that is the gimbal rings will rotate in an undersirable manner. There are also several situations in which one or both of the gimbal rings may become inverted with respect to the position in which they should be and thus yield an indication 180° in error. Either of these situations may cause very serious results if the gyroscope is used to provide a control signal for an autopilot system.

The invention will be described herein primarily as applied to a "vertical" gyroscope as the problem is more readily apparent with this type. However, the problem is also present under certain conditions in a "course" gyroscope and the invention is equally applicable thereto.

One feature of the invention is the provision of a mounting for the rotor element of a gyroscope including a first gimbal ring having the rotor element rotatably mounted thereon, a second gimbal ring having the first gimbal ring rotatably mounted thereon and means for preventing the two rings from ever lying in the same plane. Another feature is that the second gimbal ring is mounted on a third gimbal ring which is mounted on the aircraft and that means are provided for effecting the position of one of the gimbal rings as a function of the angular relationship between the other two gimbal rings. A further feature is that the position of the third gimbal ring with respect to the aircraft is such that the planes of the first and second gimbal rings are always perpendicular.

Still another feature is the provision of gyroscope rotor mounting means including a first gimbal ring having the rotor element mounted thereon, a second gimbal ring having the first gimbal ring mounted thereon, means for movably mounting the second gimbal ring on the aircraft and servo means for maintaining the rings in substantially unvarying absolute planes despite variations in the attitude of the aircraft.

A further feature is that the third gimbal ring is mounted on a fourth gimbal ring which is mounted on the aircraft. Yet another feature is that means, as servo means, are provided for affecting the positions of the third and fourth gimbal rings as functions of the positions of other rings. And still a further feature is the provision of means for causing movement of the servo means about its neutral position.

A further feature is the provision in a gyroscope mounting means of the character described of means for deriving craft attitude indications from the positions of the gimbal rings.

Still another feature is the provision in a gyroscope mounting arrangement of the character described of means for preventing movement of one of the third or fourth gimbal rings from undesirably affecting the position of the other of these rings.

Further features and advantages will readily be apparent from the following specification and from the drawings, in which:

Figure 4 is a diagrammatic view of a three gimbal gyroscope mounting;

Figure 5 is a schematic drawing of a circuit used with the mounting of Figure 4;

Figure 6 is a diagrammatic view of a four gimbal gyroscope mounting;

Figure 7 is a schematic diagram of an electrical control circuit used with the gyroscope mounting of Figure 6;

Figure 8 is a schematic diagram of a modified electrical control circuit; and

Figure 9 is a perspective view of a physical embodiment of the invention.

In order to facilitate the understanding of the present invention, an illustrative embodiment of a prior art gyroscope mounting and some of the problems resulting from the use thereof will be discussed. As mentioned briefly before, the problem and the invention will be described herein in connection with its application to a "vertical" gyroscope, but it is to be understood that the discussion and the invention are equally applicable to a "horizontal" or "course" gyroscope.

Figure 1:
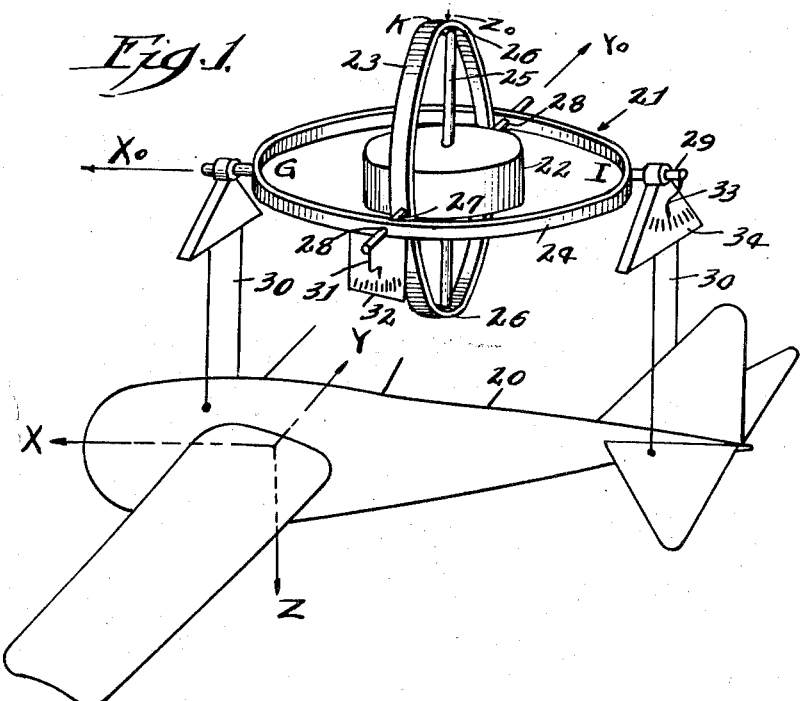
Figure 1 is a diagrammatic view of a commonly used two gimbal gyroscope mounting.

Referring now to Figure 1, an aircraft 20 is provided with a vertical gyroscope indicated generally as 21. The relative sizes of the aircraft and gyroscope are greatly exaggerated for the purposes of illustration. The gyroscope 21 includes a rotor 22, a first or inner gimbal ring 23 and a second or outer gimbal ring 24. Rotor 22 is a cylindrical body which is rotated at a high speed (by means, as an electric motor, not shown) about a shaft 25 journalled in bearings 26 carried by inner gimbal ring 23. The inner gimbal ring in turn is mounted on a shaft 27 diametrically opposed to shaft 25 and carried in bearings 28 provided in outer gimbal ring 24. Outer gimbal ring 24 is in turn rotatably mounted on a shaft 29 diametrically opposed to shaft 27 and rotatably mounted on the aircraft by means of brackets 30. It is common practice to install the vertical gyroscope in the aircraft in such a manner that shaft 27, about which gimbal ring 23 rotates, lies parallel to the axis Y of the aircraft when the craft is in wing level position. Similarly, shaft 29, about which gimbal ring 24 rotates, may be made parallel to the longitudinal axis X of the aircraft.

Aircraft attitude indications, as pitch and roll angles, may be obtained from gyroscope 21. A pointer 31 attached to shaft 27 indicates the pitch angle of the aircraft on a scale 32 carried by gimbal ring 24 while a pointer 33 carried by shaft 29 indicates the aircraft roll angle on a scale 34 secured, through support bracket 30, to the aircraft. It is to be understood that suitable electrical signal generators may be substituted for the pointer and scale indicators shown in order to provide electrical signals which are functions of the pitch and roll angles and which may be used to actuate indicating, autopilot or other desired apparatus. The relationship of the elements shown in Figure 1 is based on the assumption that aircraft 20 is in straight, level flight and that the axes $X_0$, $Y_0$ and $Z_0$ of the gyroscope are parallel to and in the same sense as the corresponding axes $X$, $Y$ and $Z$ of the aircraft.

In normal operation, the rotation of rotor element 22 tends to keep the gyroscope axis of rotation $Z_0$ vertical and gimbal rings 23 and 24 assume various positions depending on the attitude of the aircraft, the pitch and roll angles of the aircraft being indicated on scales 32 and 34 as noted previously. In many aircraft and under most flight conditions the gyroscope just described will operate satisfactorily and give accurate indications of the attitude of the aircraft. Under certain conditions, however, and particularly in fighter aircraft, such a gyroscope mounting may result in trouble.

Figure 2:
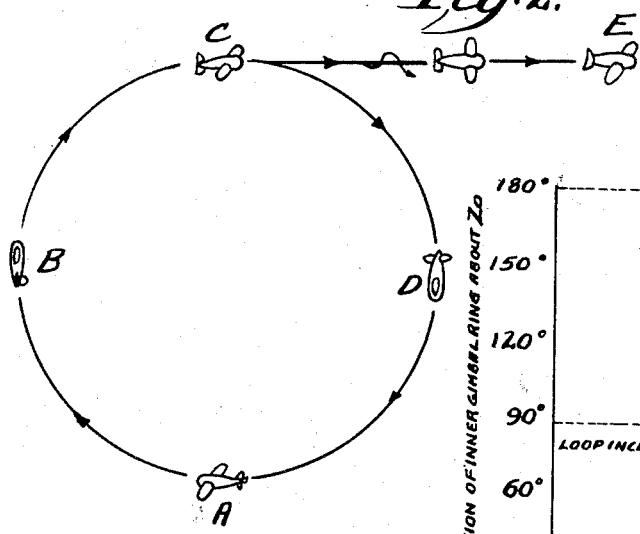
Figure 2 is a diagrammatic sketch of an aircraft maneuver.

Consider first the situation when the aircraft executes a vertical loop as shown in Figure 2. It will be assumed for the present that the loop is actually vertical in all respects, that is that the flight path of the aircraft is contained in a vertical plane which also contains the spin axis $Z_0$ of the gyroscope. When the aircraft 20 starts the maneuver at point A of Figure 2, the elements of gyroscope 21 will be in the relative positions shown in Figure 1, that is both the pitch and roll angles are zero. As the aircraft traverses the first quadrant or 90° of the loop from point A to point B, gimbal ring 23 will rotate on shaft 27 about axis $Y_0$ carrying rotor element 22 and its shaft 25 with it. Gimbal ring 24 will remain motionless with respect to the aircraft as it is assumed that there is no roll involved in the maneuver. When the aircraft reaches point B in which its longitudinal axis $X$ lies in a vertical plane, gimbal rings 23 and 24 lie in a common plane with axes $X_0$ and $Z_0$ in alignment. A consideration of this situation will indicate that if the aircraft 20 should be affected by a gust of air or the like in a manner that causes rotation about axis $Z$, which is now horizontal, the spin axis $Z_0$ of the gyroscope will be forced out of the vertical position in which it is normally maintained due to the action of rotor 22. Forces then effective on the gyroscope will cause it to spin violently or to "tumble." The operation of the gyroscope becomes erratic and the pitch and roll angle indications derived therefrom are completely unreliable.

A gyroscope is sometimes considered as having in normal operation 3 degrees of freedom, that is the spin axis $Z_0$ is free to remain in a vertical plane regardless of the actions of the aircraft, due to the pivotal mountings of two gimbal rings. However, when the two gimbal rings are aligned in a single plane, that is when the axes $X_0$ and $Z_0$ are in alignment, the system has only 2 degrees of freedom and the improper operation just described may result. It should be noted that "gimbal lock" occurs not only at the point B of a vertical loop, but also at the point D so that the possibility of gimbal tumble occurs twice during this maneuver.

Caging devices are known for stopping the rotation or tumble of the gimbal rings and for returning the gyroscope to normal operation, but these devices must be started by the pilot and take some time to operate so that if the gyroscope is connected to an autopilot system the damage may be done before the caging devices have an opportunity to restore the gyro system to equilibrium.

Assume now that aircraft 20 in executing a vertical loop passes through the gimbal lock situation at point B, Figure 2, without the gyroscope tumbling and continues on to point C at the top of the loop where the aircraft is flying at an inverted attitude. At this point the outer gimbal ring 24 has not changed its position with respect to the aircraft and the indicated roll angle on a scale 34 is zero as it should be. Gimbal ring 23 and rotating element 22 have turned through an angle of 180° with respect to gimbal ring 24 (i. e., ring 23 and rotating element 22 have maintained their original attitude with respect to the ground). Thus, the indicated pitch angle is, properly, 180°. As the aircraft continues on through the loop the relative movements of gimbal rings 23 and 24 continue and both the indicated pitch and roll angles at point A are zero. On the other hand, if at point C the pilot causes the aircraft to execute a half roll in order to return to an upright attitude (an Immelmann turn) gimbal rings 23 and 24 will remain in their same positions relative to each other and relative to the ground while outer gimbal ring 24 turns 180° with respect to the aircraft 20. Thus, at the point indicated as point E in Figure 2 the gyroscope gives an indication of a pitch angle of 180° and a roll angle of 180°, both of which are in error by 180°. It is obvious that such indications are not only useless for controlling an autopilot but might have disastrous results.

The foregoing discussion has been based on the assumption that the flight path of the aircraft in executing the loop is contained in a vertical plane. It is of course obvious that such a situation occurs in practice only by mere chance. Generally the flight path of an aircraft executing a loop is inclined at least a small amount in respect to a vertical plane. The movements of the gimbal rings of a gyroscope during an inclined loop are considerably more complex than in a vertical loop.

At point A, the start of the loop, the wings of the aircraft are inclined by a certain amount from the horizontal and outer gimbal ring 24 is rotated through an appropriate angle with respect to support brackets 30, which are secured to aircraft 20. As the aircraft begins to climb into the loop from point A, outer gimbal ring 24 turns on its shaft 29 about axis $X_0$ until at point B it has assumed a position in which axis $Y_0$ has turned 90° and the roll angle indicated on scale 34 is 90°. This follows from the fact that axis $Y_0$ tends to stay in a horizontal plane due to the action of the gyroscope rotor element 22. Gimbal ring 23 during this movement rotates about shaft 27, axis $Y_0$, and also has a component of rotation about axis $Z_0$ due to the rotation of outer gimbal ring 24 about the axis $X_0$, which approaches axis $Z_0$ as the aircraft approaches point B of the loop. (Axes $X_0$ and $Z_0$ will of course not coincide during an inclined loop as they would during a vertical loop, but they come closest to alignment at point B.)

By far the greatest portion of the movement of the gimbal rings between A and B takes place in the region near point B and very high rotational accelerations may be encountered. As the angle of inclination of the loop is decreased the rapidity of the motion of the gimbal rings in the vicinity of point B is increased.

Figure 3:
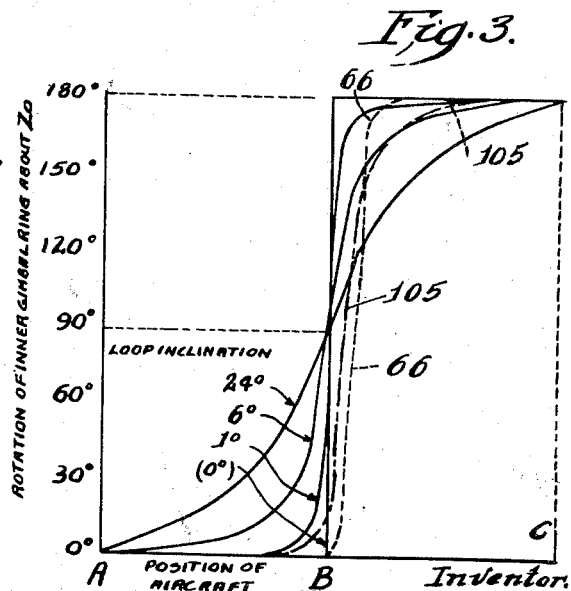
Figure 3 is a graphical representation of the gimbal motion about a vertical axis during the first 180° of a loop.

This situation is illustrated graphically in Figure 3 where the rotation of inner gimbal ring 23 about axis $Z_0$ (due to rotation of outer gimbal ring 24 about axis $X_0$) is plotted as a function of the position of the aircraft. The family of solid line curves illustrate the variation in the gimbal motion with varying loop inclinations.

Consideration of the relative positions of the gimbal rings 23 and 24 when the aircraft is in the vicinity of the point B shows that the forces acting on the bearings 28 in which shaft 27 is mounted are in such a direction that the bearings may jam as a result of the friction therein preventing the proper free movement of ring 23 about the axis $Y_0$. The jamming of these bearings causes an effective gimbal lock condition with the same result as the gimbal lock situation discussed in connection with the vertical loop. It has been found that this situation may occur whenever the inclination of the loop is less than 5°.

It should be noted that if the aircraft in an inclined loop passes through the effective gimbal lock position without the gyroscope being caused to tumble, the pitch and roll angles at point C, the top of the loop, are correct rather than the roll angle being 180° in error as was found to be the case after the first half of a vertical loop. This follows from the fact that in the vertical loop there is no rotation of outer gimbal ring 24 about the axis $X_0$ while in the inclined there is such a rotation, the amount depending on the angle of inclination of the loop.

It should be noted that, reasoning from the graph of Figure 3, inner gimbal ring 23 should turn instantaneously 180° about axis $Z_0$ at point B when the angle of inclination of the loop is zero (a vertical loop). This means that at this point the outer gimbal ring 24 would have to make a similar 180° revolution about axis $X_0$, but as we have seen in the previous discussion of a vertical loop this does not occur, resulting in the erroneous roll indication following the Immelmann turn.

Referring now to Figure 4, an improved gyroscope mounting is illustrated. Elements of the system shown in Figure 4 corresponding to elements of Figure 1 will be given reference numerals 20 higher than in Figure 1 to facilitate the description thereof.

The gyroscope rotor element 42 is mounted on a shaft 45 rotatably carried in bearings 46 on a first or inner gimbal ring 43. Gimbal ring 43 is mounted on a shaft 47 carried in bearings 48 of the second gimbal ring 44. Gimbal ring 44 is mounted on a shaft 49 which instead of being rotatably mounted on the aircraft is carried in bearings 60 on a third gimbal ring 61. Third gimbal ring 61 is mounted on a shaft 62 rotatably carried on a frame 50 mounted on the aircraft 40. Gimbal ring 61 is not freely rotatable but is driven by a servo motor 63 about the horizontal axis X of the aircraft (this axis corresponds to the axis $X_0$ of the gyroscope when the aircraft is in level flight).

Motor 63 is driven in such a manner that shaft 49 remains in a horizontal attitude regardless of the attitude of the aircraft. A signal generator includes a potentiometer resistance element 64 mounted on gimbal ring 44 and a movable arm 64a mounted on shaft 47 so as to turn therewith for energizing motor 63 as a function of the angular relationship between rings 43 and 44. The circuit for motor 63, which may be a servo motor, is shown in Figure 5 where a source of voltage such as battery 65 is connected to resistance element 64 and motor 63 is connected between the center point of the battery 65 and movable arm 64a of the potentiometer. So long as rings 43 and 44 are in the proper angular relation, arm 64a will be on the center point of resistance 64 and the motor will not be energized.

It should be noted that the first and second gimbal rings 43 and 44, are shifted 90° with respect to the aircraft, as compared with the gyroscope of Figure 1. That is, in level flight and wing level condition, shaft 47 about which first gimbal ring 43 turns is parallel to the X axis of the aircraft, while shaft 49 about which second gimbal ring 44 turns is parallel to the Y axis of the aircraft. If such a mounting of the first and second rings were used with the system of Figure 1, the possibility of gimbal lock would occur during a roll, rather than during a loop.

The operation of the gyroscope mounting of Figure 4 during a loop is similar to that of the mounting of Figure 1, outer gimbal ring 61 turns with the aircraft and the remainder of the gyroscope elements maintain their original positions. In a level roll, however, as soon as ring 44 begins to turn about axis $X_0$, movable arm 64a of the potentiometer moves off the center point of resistance 64 and servo motor 63 starts running in such a direction as to turn ring 61, and ring 44 which is carried therewith, back to their original horizontal positions. This action continues as the plane moves through the roll and at a point where the wings of the aircraft are vertical mounting bracket 50 assumes the broken line position shown in Figure 4 while the remainder of the elements of the gyroscope system are in their original position. It can be seen from this that the planes of gimbal rings 43 and 44 can never coincide but always remain substantially at right angles to each other and thus the gyroscope can never get into "gimbal lock" position. Gimbal rings 43 and 44, in addition to maintaining the same positions relative to each other, remain at all times in the same absolute planes. That is they keep the same attitudes relative to the earth regardless of the maneuvers made by the aircraft.

The roll angle of the aircraft is in this case obtained by means of a pointer 51 mounted on shaft 62 and a scale 52 carried by mounting bracket 50 while the pitch angle is obtained from a scale 54 mounted on the third or outer gimbal ring 61 and a pointer 53 carried by shaft 49. It should be noted that the pitch angle is measured about an axis (shaft 49) which is always horizontal and thus an accurate indication is always given.

The system of Figure 4 solves the problem of gimbal lock and prevents the gyroscope from tumbling, and, as will appear, also provides unique and accurate indications of the pitch and roll of the aircraft.

Theoretically, during an Immelmann turn and certain other maneuvers involving a half loop erroneous indications might be obtained. It will be seen by a comparison of Figures 1 and 4 that the movement of third ring 61 of Figure 4 corresponds exactly with that of outer ring 24 of Figure 1 while the movement of second ring 44 is similar, although displaced by 90°, to the movement of inner ring 21. Thus during an inclined loop, ring 61 is driven by motor 63 in a manner analogous to the movement of the gimbal rings of Figure 1 plotted in Figure 3. Since ring 61 is motor driven the possibility of effective gimbal lock or bearing jam during the rapid movement of ring 61 in the vicinity of point B of an inclined loop is eliminated. However, in a strictly vertical loop, there is no component of roll whatsoever and outer ring 61 turns with the plane, becoming inverted at point C giving rise to an erroneous indication after an Immelmann turn.

The gyroscope is in a condition of unstable equilibrium at point B of a vertical lop however and the slightest disturbance or vibration will move arm 64a off the center point of resistor 64 energizing servo motor 63 to drive ring 61 and thus ring 44 through 180° about axis $Z_0$. Due to the limitations of the servo motor, this movement may lag somewhat behind the theoretical instantaneous movement plotted in Figure 3 and is indicated by broken curve 66.

In practice, the vibration of the aircraft should be sufficient to unbalance the system and cause the described operation. However, the modified control circuit of Figure 8 may be substituted for that of Figure 5 to eliminate any possibility of error. This modified circuit provides for oscillating servo motor 63 and gimbal ring 61 about their neutral positions. In Figure 8 servo motor 63 is connected to battery 65 through a polarized relay 110. The actuating coil 110a of the relay is connected between the movable arm 64a of the potentiometer 64 and the center tap of battery 65 so that the direction of the current flow through the coil is dependent on the direction of displacement of arm 64a of the potentiometer. One terminal of motor 63 is connected to the movable contact 110b of the relay while the fixed contacts 110c and 110d are connected to opposite terminals of battery 65. Relay coil 110e will be ignored temporarily. Relay 110 is of a type in which the movable contact 110b is in engagement with one or the other of the fixed contacts at all times, except of course when it is moving from one to the other. This circuit causes the motor to turn back and forth continuously about a center point where shaft 49 of gimbal ring 44 is horizontal. The amplitude of this motion may be adjusted by a proper selection of circuit components so that the movement is hardly perceptible and in no way impairs the accuracy of the aircraft attitude indications derived from the gyroscope.

It is also desirable to add to the relay 110 a second coil 110e connected in shunt with servo motor 63 and wound in such a manner that the magnetic field induced thereby opposes the magnetic field of coil 110a. The relay now acts as an amplifier with almost proportional characteristics and reduces the possibility of the servo response being erratic at certain critical roll and pitch velocities.

Referring to Figure 4, it will be seen that the axis or mounting shaft 62 is parallel to the longitudinal axis of the aircraft 40. Under these conditions the roll and pitch angle indications provided by the elements 52 and 54 respectively are correct regardless of the attitude of the aircraft during normal maneuvers. It will be understood, however, that the axis 62 may be arranged transversely of the aircraft, if desired; i. e., rotated 90° in the plane of the ring 61 as illustrated. Under these conditions avoidance of gimbal lock is retained and angular indications are provided; but where the aircraft is undergoing both roll and pitch the individual angular indications modify each other and are not truly accurate independent indications of roll and pitch, respectively. However, they do bear a definite mathematical relation to the true roll and pitch angles and can be used to actuate an autopilot if desired. However, I consider as preferable the arrangement illustrated in Figure 4 which provides true indications of the angles even though both roll and pitch are involved in a given maneuver.

My preferred improved mounting arrangement, however, involves the use of a fourth gimbal ring, as will be hereafter described in detail. In the arrangement illustrated in Figure 4, ring 61 is rotated about axis 62 by servo motor 63, so that friction may be disregarded insofar as the movement of this gimbal ring is concerned. However, when not only roll but also pitch of the aircraft is involved in a maneuver, rotation of the ring 44 about the axis 49 must be effected by the tendency of the gyroscope rotor to remain fixed in space; and any friction in the bearings 60 tends to cause drift of the rotor axis and consequent inaccuracy. By adding a fourth gimbal ring with a servo motor to determine its position relative to the aircraft, I obviate this disadvantage of the three ring system.

Turning now to Figure 6, a four-gimbal gyroscope mounting system will be described. Reference numerals 30 higher than those used in the description of the three-gimbal system of Figure 4 will be used to indicate like elements. The gyroscope rotor element and the first three gimbal rings are identical with the system of Figure 4. The rotor element 72 is mounted on a shaft 75 rotatably carried in bearings 76 of first gimbal ring 73 which in turn is mounted on a shaft 77 mounted in bearings 78 forming a part of second gimbal ring 74. Gimbal ring 74 is carried on a shaft 79 mounted in bearings 90 on third gimbal ring 91 which is mounted on shaft 92. Shaft 92 instead of being mounted directly on the aircraft frame is carried in suitable bearings provided in a fourth gimbal ring 100 which is in turn mounted on a shaft 101 rotatably mounted on brackets 80 secured directly to aircraft 70. Third gimbal ring 91 is once again driven by a servo motor 93 as a function of the angular relationship between gimbal rings 73 and 74. Fourth gimbal ring 100 is similarly driven about shaft 101 by a second servomotor 102 as a function of the angular relationship between second gimbal ring 74 and third gimbal ring 91.

The circuit for energizing servomotors 93 and 102 is shown in Figure 7. Motor 93, associated with third gimbal ring 91, is connected between the center tap of battery 95 and movable arm 94a associated with potentiometer resistance 94, the resistance element 94 again being mounted on second gimbal ring 74 and the movable arm 94a being mounted on shaft 77 for movement with first gimbal ring 73. Motor 102, associated with fourth gimbal ring 100 is connected in a similar control circuit with potentiometer resistance element 103, mounted on third gimbal ring 91, and movable arm 103a mounted on shaft 79 for movement with second gimbal ring 74. Servomotor 93 and its associated circuit function as before driving gimbal ring 91 in such a manner that the shaft 79 on which gimbal ring 74 is mounted is always maintained in a horizontal plane. Servomotor 102 operates in a similar manner rotating fourth gimbal ring 100 about shaft 101 in such a manner that shaft 92, carrying third gimbal ring 91, is always horizontal.

The pitch angle of the aircraft is indicated by a pointer 81 on shaft 92 and scale 82 carried by fourth gimbal ring 100. As shaft 92 is always horizontal the pitch angle indication will be accurate regardless of the roll attitude of the aircraft. The roll angle is indicated by a pointer 83 on shaft 101 and a scale 84 mounted on bracket 80.

During a simple roll, third and fourth gimbal rings 91 and 100 will begin to turn with the plane while first and second rings 73 and 74 will remain in their original positions. As soon as movable arm 103a is moved off the center point of potentiometer 103, servomotor 102 is energized causing it to turn fourth gimbal ring 100 in a direction opposed to the roll so that both rings 91 and 100 remain substantially in their initial horizontal position, the roll angle being indicated by pointer 83 on scale 84.

During a loop the action is similar, rings 73, 74 and 91 remaining in their original horizontal positions while the fourth gimbal ring turns about the axis $Y_0$ as a result of the movement of the plane and about the axis $X_0$ due to the operation of the motor 102. As the shaft 92 is maintained in a horizontal plane the true pitch angle is indicated on scale 82 under all conditions.

It should be noted that the movement of third gimbal ring 91 about axis $X_0$ due to the operation of servomotor 102 corresponds to the previously discussed movement of inner gimbal ring 23 about axis $Z_0$ in the two ring system of Figure 1. The plane of ring 91 however is 90° displaced with respect to the plane of ring 23. Similarly, the movement of fourth gimbal ring 100 corresponds exactly with the movement of outer gimbal ring 24 of Figure 1. Thus during an inclined loop, servomotor 102 will drive fourth gimbal ring 100 in such a manner that gimbal ring 91 will rotate about axis $X_0$ in a manner corresponding to the solid line curves of Figure 3. Servomotor 93 at the same time turns gimbal ring 91 about the axis $Y_0$ so as to maintain the ring in a horizontal plane. Inasmuch as the rings are motor driven there is no possibility of the bearings jamming and "effective gimbal lock" occurring. However due to the limitations of the servomotors themselves the motion of gimbal ring 91 may lag somewhat behind the theoretical motion as indicated by the broken curve 105, Figure 3. While the aircraft attitude indications derived from the gyroscope during such a maneuver may be slightly in error this is not serious as they correct themselves as soon as the maneuver is completed.

There is still one maneuver in which the system of Figure 6 may yield an incorrect roll indication. This occurs where the aircraft executes a vertical loop. In this maneuver the aircraft does not at any time have a rolling motion. Gimbal ring 74 does not turn about axis $X_0$, potentiometer arm 103a does not move from the center position of resistor 103 and servomotor 102 is not energized. Thus at position C of the loop the indicated roll is still 0° and if the aircraft should do a half roll back to an upright position there would be indications of 180° roll and 180° pitch, both of which are in error by 180°. It will be recalled that in the discussion of Figure 3 it was pointed out that theoretically during a vertical loop the inner gimbal ring of a two ring system should turn 180° instantaneously at the point where the aircraft is in a vertical attitude but that this does not happen resulting in the erroneous attitude indications discussed in connection with the conventional gimbal system after an Immelmann turn. The same thing occurs in the system of Figure 6 in a vertical loop as servomotor 102 is never energized.

In this critical case however the system is in a state of unstable equilibrium and any slight displacement of movable arm 133a from the center position on potentiometer 103 will cause motor 102 to turn the entire gimbal system through 180°. Preferably an oscillating arrangement (as that illustrated in Figure 8 and heretofore described) is utilized to ensure a quick return to an accurate indicating position.

The gyroscope mounting systems shown in Figures 4 and 6 are diagrammatic in form for the sake of simplicity. A practical physical embodiment of the system of Figure 6 is shown in Figure 9. Reference numerals 100 higher than those used in Figure 6 will be used in describing Figure 9.

The rotor element of the gyroscope (not shown) is housed within a casing 172 which serves as a first or inner gimbal ring and which is in turn mounted on a shaft 177 carried by second gimbal ring 174. Gimbal ring 174 is in turn mounted on shaft 179 carried by third gimbal ring 191 in turn mounted on shaft 192 carried by outer gimbal ring 200. Outer gimbal ring 200 is mounted on shaft 201 carried by a framework 180 which may be secured to the frame of the aircraft.

Servomotor 202 is mounted on frame 180 and, through gears 215, 216, 217 and 218, turns a tubular shaft 219 which is fixedly secured to the outer gimbal ring 200. A second gear 220, also secured to tubular shaft 219, transmits the rotational position of gimbal ring 200 through a gear 221 to a signal source 183' which furnishes an electrical indication of the roll angle of the aircraft in a manner similar to the pointer on the scale shown in Figure 6. It is generally desirable to have this information in the form of electrical signals which may be utilized directly in autopilot and indicator systems. Potentiometer 203 mounted on gimbal ring 191 and movable arm 203a mounted on shaft 179 provide the desired actuating signal for servomotor 202.

Servomotor 193, which drives third gimbal ring 191, is not mounted on gimbal ring 200 as indicated diagrammatically in Figure 6 as it is undesirable to add such a heavy weight to the gimbal ring and it would be impractical to design a motor which would drive the gimbal ring directly rather than through a gear train. An annular bevel gear 225 is secured to and forms an integral part of third gimbal ring 191 and lies in a plane 90° displaced therefrom. A pinion 226 is mounted on the end of a shaft 227 which extends through tubular shaft 219, pinion 226 engaging bevel ring gear 225.

If we assume that shaft 227 is driven positively by servomotor 193 it will be found that there is an undesired interaction between the two servomotors. When the aricraft rolls, motor 202 through shaft 219 turns the outer gimbal ring 200 and all the parts mounted on it including third gimbal 191 and the ring gear 225 about axis $X_0$. However, pinion 226 is at rest during this movement and causes ring gear 225 to turn about axis $Y_0$. The resulting displacement of potentiometer arm 203a immediately starts servomotor 193 causing it to drive pinion 226 in such a manner as to eliminate the rotation of ring gear 225 and third gimbal ring 191 about axis $Y_0$. Thus the performance of the gyroscope would be as desired, but the angular position of shaft 227 would be a function of both the pitch and roll angles of the aircraft and a true indication of the aircraft pitch could not be obtained therefrom.

This difficulty is eliminated by the provision of a differential gear arrangement indicated generally as 228. Servomotor 193, through gears 229 and 230, drives a shaft 231 to which is secured the transverse axis 228a of the differential gear. The differential gear arrangement also includes a pair of planetary gears 228b and solar gears 228c and 228d. Solar gear 228d is driven by gear 220 mounted on tubular shaft 219 while solar gear 228c through gears 232, 233 and 234 drives shaft 227. Now if the aircraft should roll, rotation of shaft 219 is transmitted through differential gear 228 to shaft 227, the gear ratios being selected so that pinion 226 drives ring gear 225 at the proper rate to keep gimbal ring 191 horizontal. Thus, servomotor 193 is energized only when the aircraft pitches displacing potentiometer arm 94a from the center point of potentiometer 94 and the angular position of shaft 231 is directly proportional to the pitch angle of the aircraft. Shaft 231 may in turn be utilized to drive a signal generator 181' to produce an electrical signal proportional to the pitch of the aircraft.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Mounting means for the rotor element of a gyroscope, including: a first gimbal ring having the rotor element rotatably mounted thereon; a second gimbal ring having said first gimbal ring rotatably mounted thereon; a third gimbal ring having said second gimbal ring mounted thereon; a fourth gimbal ring having said third gimbal ring mounted thereon; means affecting the position of one of said gimbal rings as a function of the angular relationship between two other of said rings; and means affecting the position of another of said gimbal rings as a function of the angular relationship between two of said rings other than that being affected, said position affecting means preventing at least two of said rings from ever lying in the same plane.

2. Mounting means for the rotor element of a gyroscope, including: a first gimbal ring having the rotor element rotatably mounted thereon; a second gimbal ring having said first gimbal ring rotatably mounted thereon; a third gimbal ring having said second gimbal ring mounted thereon; a fourth gimbal ring having said third gimbal ring mounted thereon; means affecting the position of said third gimbal ring as a function of the angular relationship between the first and second rings; and means affecting the position of said fourth gimbal ring as a function of the angular relationship between the second and third rings, said position affecting means preventing said first and second rings from ever lying in the same plane.

3. Mounting means for the rotor element of a gyroscope, including: a first gimbal ring having the rotor element rotatably mounted thereon; a second gimbal ring having said first gimbal ring rotatably mounted thereon; a third gimbal ring having said second gimbal ring mounted thereon; a fourth gimbal ring having said third gimbal ring mounted thereon; means for movably mounting said fourth gimbal ring; means affecting the position of said third gimbal ring as a function of the angular relationship between the first and second rings; and means affecting the position of said fourth gimbal ring as a function of the angular relationship between the second and third rings, said position affecting means preventing said first and second rings from ever lying in the same plane.

4. Means for mounting the rotor element of a gyroscope in a craft capable of assuming different attitudes, including: a first gimbal ring having the rotor element rotatably mounted thereon; a second gimbal ring having said first gimbal ring rotatably mounted thereon; a third gimbal ring having said second gimbal ring mounted thereon; a fourth gimbal ring having said third gimbal ring mounted thereon; means for movably mounting said fourth gimbal ring on said craft; and servo means for maintaining said first and second rings in substantially unvarying absolute planes despite variations in the attitude of said craft.

5. Apparatus of the character claimed in claim 4, wherein said servo means includes separate motor means operative to affect the positions of each of said third and fourth rings.

6. Apparatus of the character claimed in claim 4, including means for normally oscillating said servo means about its neutral position.

7. Mounting means for the rotor element of a gyroscope including: a first gimbal ring having the rotor element rotatably mounted thereon; a second gimbal ring having the first gimbal ring rotatably mounted thereon; a third gimbal ring having said second gimbal ring mounted thereon; means for movably mounting said third gimbal ring; motor means for affecting the angular relationship between two of said rings; means responsive to the angular relationship between a different two of said rings for actuating said motor means, and including means for normally oscillating said motor means back and forth about its neutral position, the motor means and angular relationship responsive means preventing at least two of said rings from ever lying in the same plane.

8. Apparatus of the character claimed in claim 2, including means for preventing movement of one of said two last mentioned gimbal rings from undesirably affecting the position of the other ring.

9. Apparatus of the character claimed in claim 4, including means for deriving craft attitude indications from the positions of said third and fourth rings.

10. Mounting means for the rotor element of a gyroscope including: a first gimbal ring having a rotor element rotatably mounted thereon; a second gimbal ring having the first gimbal ring rotatably mounted thereon; a third gimbal ring having the second gimbal ring mounted thereon; a fourth gimbal ring having the third gimbal ring mounted thereon; first motor means spaced from said gimbal rings for affecting the position of one of the rings as a function of the angular relationship between two other of the rings; second motor means spaced from said gimbal rings for affecting the position of another of the gimbal rings as a function of the angular relationship between two other of the rings, the motor means preventing at least two of the rings from ever lying in the same plane; and drive means interconnecting the motor means and the gimbal rings, the drive means including means for preventing interaction between the two motor means.

11. Gyroscope mounting means of the character described in claim 10, wherein the means for preventing interaction between the motor means includes a differential gear in said drive means.

12. Gyroscope mounting means of the character described in claim 10, wherein an electrical signal source is associated with said drive means for deriving electrical signals corresponding to the position of certain of said gimbal rings.

References Cited in the file of this patent

UNITED STATES PATENTS

| | | |
|---|---|---|
| 2,386,176 | White | Oct. 9, 1945 |
| 2,469,782 | Phair | May 10, 1949 |
| 2,584,876 | Haskins | Feb. 5, 1952 |
| 2,595,951 | Konet | May 6, 1952 |